July 25, 1967   J. A. McDOUGAL   3,332,476
CARBURETOR COOLING MEANS
Filed June 9, 1965

INVENTOR.
John A. McDougal
BY
J. L. Carpenter
ATTORNEY

3,332,476
CARBURETOR COOLING MEANS
John A. McDougal, Flint, Mich., assignor to General Motors Corporation, Detroit, Mich., a corporation of Delaware
Filed June 9, 1965, Ser. No. 462,574
3 Claims. (Cl. 165—51)

ABSTRACT OF THE DISCLOSURE

A carburetor cooling means for an internal combustion engine characterized by an evaporator containing a liquid that is evaporated by the heat conducted from the intake manifold and a condenser adapted to be located at a cooler position. The liquid vaporized by the evaporator passes through a conduit to a condenser where it is liquified and returned to the evaporator.

---

Figure 1:
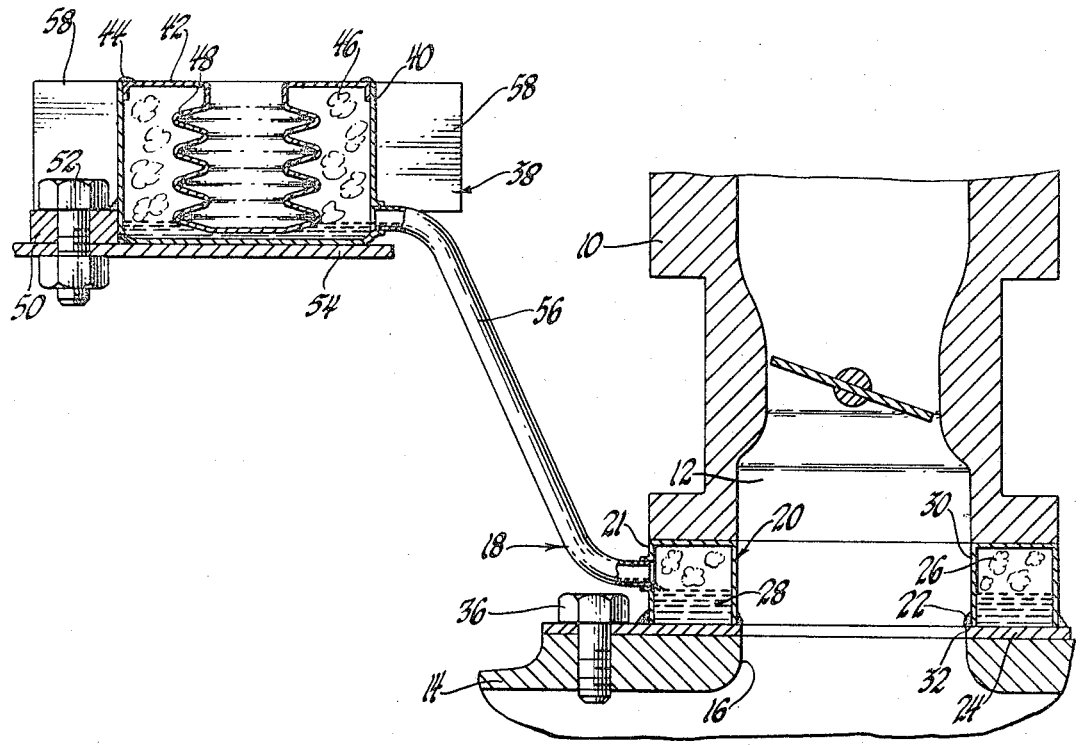

When an internal combustion engine is operated, heat flows from the combustion chambers to the intake manifold and then to the carburetor wherein it vaporizes a portion of the fuel in the carburetor fuel bowl which then passes into the atmosphere through the fuel bowl vent. After the engine has been operated, residual engine heat will often continue the vaporization of the fuel in the carburetor fuel bowl to make restarting of the engine difficut because the fuel level in the bowl is low.

The present invention solves this problem by providing a carburetor cooling means which interrupts the heat flowing to the carburetor and dissipates it to the atmosphere. In a preferred embodiment, an evaporator is located between the carburetor and the intake manifold of the engine. A liquid contained within the evaporator absorbs heat from the intake manifold and is thereby vaporized. The vapor is then liquefied in a condenser located in a cooler area and returned to the evaporator where the process is repeated.

Accordingly, a principal object of the present invention is to provide an improved arrangement for interrupting the heat flow from the intake manifold to the carburetor of an internal combustion engine.

Another object of the invention is to provide an improved carburetor cooling means for an internal combustion engine.

A further object is to provide such a carburetor cooling means which is effective to prevent vaporization of the fuel within the carburetor fuel bowl.

Yet another object is to provide such a carburetor cooling means which includes a vaporizable heat absorbing means and a condensing means.

A still further object is to provide such a carburetor cooling means which includes an evaporator located between the intake manifold and the carburetor and containing a vaporizable liquid to absorb heat from the intake manifold and a condenser to liquefy the vapor.

These and other objects of the invention will be apparent to one skilled in the art upon a reading of the following detailed description.

Figure 2:
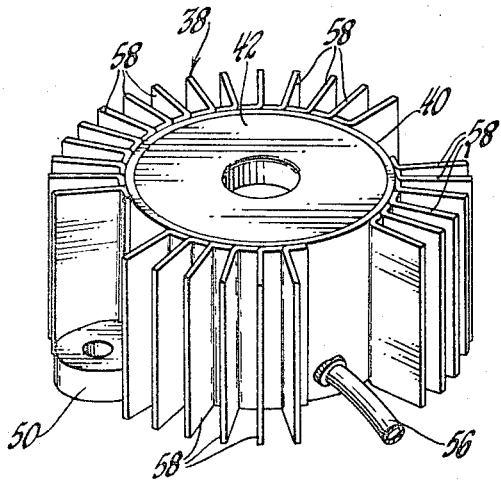

In the drawing:

FIGURE 1 is a partially broken away view of an internal combustion engine embodying a carburetor cooling means according to this invention; and FIGURE 2 is a perspective view of a modification of the condenser shown in FIGURE 1.

Referring to FIGURE 1, there is shown a portion of an internal combustion engine which includes a conventional carburetor 10 with a throat 12 through which an air-fuel mixture is delivered to an intake manifold 14 through the manifold opening 16. From the intake manifold, the air-fuel mixture is distributed to the individual combustion chambers of the engine where it is ignited. A considerable amount of heat is released upon ignition and this heat travels by means of conduction to other parts of the engine, including the intake manifold and carburetor.

The carburetor cooling means 18 generally includes an evaporator 20 located between the carburetor 10 and the intake manifold 14 and having an annular evaporator housing 21 brazed at 22 to an annular base plate 24 to define an evaporator chamber 26. Contained within the chamber 26 is a suitable vaporizable substance 28, such as alcohol, which is a liquid at normal temperature and pressure. The openings 30 and 32 in the evaporator 20 and the base plate 24, respectively, connect the carburetor throat 12 with the manifold opening 16. The base plate 24 is bolted at 36 to the manifold 14. The carburetor 10 is suitably attached to the evaporator housing 21.

An air cooled condenser 38 includes an annular housing 40 and a flanged top cover 42 which is brazed at 44 to the housing 40 to provide a condenser chamber 46. Attached to the top cover 42 and extending into chamber 46 is a resilient bellows 48 which controls pressure rise within the system. The resilient bellows 48 permits the substance 28 to vaporize at a lower temperature than would be possible otherwise. A plurality of apertured flanges 50 at the base of the housing 40 receive bolts 52 to secure the condenser 38 to a relatively cool portion of the body sheet metal 54.

A flexible conduit 56 interconnects chambers 26 and 46 to form a closed system and provides the means by which the substance 28 in both vapor and liquid form is transferred between the chambers. Cooling fins 58, shown in FIGURE 2, may optionally be arranged about the periphery of the housing 40 to aid in heat dissipation.

During engine operation a certain portion of the heat within the intake manifold 14 is normally transferred by conduction to the carburetor 10. The evaporator 20 receives the greater portion of this heat which is then absorbed by the substance 28 which is thereby vaporized. The vapor rises in the chamber 26 and flows up the conduit 56 to the condenser 38 where it is cooled and liquefied.

As the substance 28 is liquefied, it falls to the bottom of the condenser 38 where it then flows down the conduit 56 and re-enters the evaporator 20. Since, in this illustrative embodiment, the fluid return is by gravity, the condenser 38 is located at a higher elevation than the evaporator 20. It is obvious however that pumping means could be used to return the liquid to the evaporator 20. It is also obvious that means other than air cooling means could be used to liquefy the vapor within the condenser 38.

Thus this invention discloses an improved carburetor cooling means.

I claim:
1. In an internal combustion engine having a carburetor and a heated intake manifold,
    carburetor cooling means comprising,
    an evaporator located between said carburetor and said intake manifold, a vaporizable liquid within said evaorator which absorbs heat and is vaporized,
    a condenser for liquefying vaporized liquid,
    means for transporting said vaporized liquid to said condenser where it is liquefied, and for returning said liquid to said evaporator.
2. In an internal combustion engine having a carburetor and a heated intake manifold,
    carburetor cooling means comprising,
    an evaporator located between said carburetor and said intake manifold and including an evaporator camber which contains a vaporizable liquid therewithin which absorbs heat and is vaporized, a condenser for liquefying the vapor, said condenser including a condenser chamber, passage means between said evaporator chamber and said condenser chamber, said chambers and said passage means defining a closed system, said passage means transporting the vapor to said condenser where it is liquified and returning the liquid to said evaporator, and means controlling pressure rise in the system.

3. The invention claimed in claim 2 wherein said means controlling pressure rise is a resilient bellows.

References Cited

UNITED STATES PATENTS

| | | | |
|---|---|---|---|
| 1,794,448 | 3/1931 | Derby | 165—105 X |
| 1,989,519 | 1/1935 | Hyatt | 165—105 X |
| 2,026,423 | 12/1935 | Fiene | 165—105 X |
| 2,048,882 | 7/1936 | Mullen | 165—105 X |
| 2,372,272 | 3/1945 | Helmore | 123—119 |
| 2,472,717 | 6/1949 | Morey | 165—105 X |
| 2,573,095 | 10/1951 | Ellis | 123—122 |
| 2,715,520 | 8/1955 | Boyce | 123—122 X |
| 2,766,974 | 10/1956 | McConnell | 165—51 X |
| 2,864,355 | 12/1958 | Woodworth | 123—122 |
| 3,143,592 | 8/1964 | August | 165—105 X |
| 3,201,934 | 8/1965 | Smith | 165—52 X |
| 3,246,841 | 4/1966 | Kling | 165—106 X |

FOREIGN PATENTS

| | | |
|---|---|---|
| 366,402 | 7/1906 | France. |
| 263,511 | 12/1926 | Great Britain. |

ROBERT A. O'LEARY, *Primary Examiner.*

A. W. DAVIS, *Assistant Examiner.*